April 23, 1963    G. SCHULZ    3,086,928
PROCESS OF PRODUCING CITRIC ACID
Filed Aug. 10, 1959
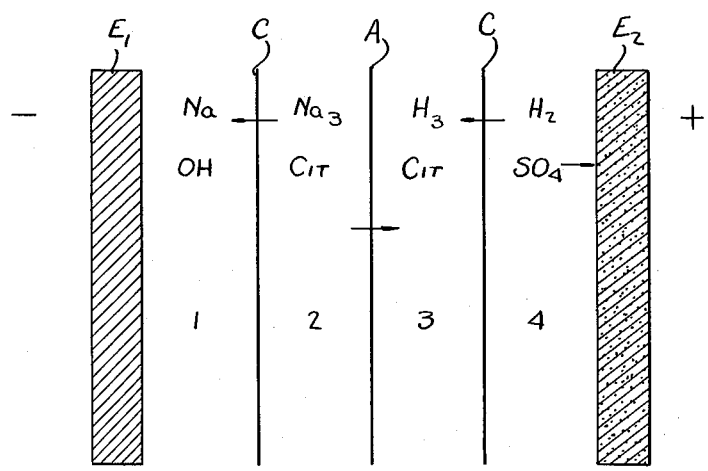
$E_1$ = STAINLESS STEEL CATHODE
$E_2$ = GRAPHITE ANODE
C = CATION EXCHANGE MEMBRANE
A = ANION EXCHANGE MEMBRANE
1, 2, 3, 4 = NUMBERS OF COMPARTMENTS
INVENTOR.
GUENTHER SCHULZ
BY Erich M. H. Radloff
AGENT

United States Patent Office 3,086,928
Patented Apr. 23, 1963

3,086,928
PROCESS OF PRODUCING CITRIC ACID
Guenther Schulz, Mannheim, Germany, assignor to Joh.
A. Benckiser G.m.b.H. Chemische Fabrik, Ludwigshafen (Rhine), Germany, a corporation of Germany
Filed Aug. 10, 1959, Ser. No. 832,446
Claims priority, application Germany Aug. 9, 1958
6 Claims. (Cl. 204—72)

The present invention relates to an improved process of producing citric acid and more particularly to a process of producing citric acid by fermentation of aqueous sugar solutions by means of *Aspergillus niger*.

It is known to produce citric acid by fermentation of aqueous sugar solutions by means of *Aspergillus niger*. The citric acid obtained in such a fermentation process contains, after fermentation is completed, unfermented sugar as well as ionogenic and non-ionogenic impurities which have been formed as by-products of the fermentation process. Solutions which are very considerably contaminated by such by-products are obtained when using molasses as starting material in place of pure sugar solutions. Molasses is the most commonly used starting material in the large scale production of citric acid by fermentation.

All the heretofore known processes of recovering substantially pure citric acid from the resulting strongly contaminated fermentation citric acid solutions consist in precipitating the citric acid in the form of one of its difficultly soluble calcium salts. The filtered citrate is then reacted with sulfuric acid to yield free citric acid and gypsum, which are separated by filtration.

Ordinarily, the citric acid is precipitated in the form of its tri-calcium salt. Recently, a process has become known according to which calcium monohydrogen citrate is precipitated which is subsequently treated with sulfuric acid in the above described manner. The aqueous citric acid solution obtained according to this process, however, is still contaminated by dissolved calcium sulfate and other ionogenic and non-ionogenic impurities.

It is also known to cause citric acid to directly crystallize from fermentation solutions. However, such a directly crystallized citric acid requires complicated purification operations in order to yield a substantially pure product. This process, furthermore, is applicable only to specific fermentation solutions.

All these known processes of precipitating, separating, and purifying citric acid from fermentation solutions have many disadvantages and are rather complicated.

It is one object of the present invention to provide an improved process of isolating citric acid from fermentation solutions in a simple and effective manner and in a substantially pure state.

Another object of the present invention is to provide a simple and effective process of isolating and purifying alkali metal citrates of remarkable purity from fermentation solutions.

A further object of the present invention is to provide a simple and effective process of working up the mother liquors and wash waters obtained in the recovery of citric acid and its alkali metal salts from fermentation solutions.

Other objects of the present invention and advantageous features thereof will become apparent as the description proceeds.

In principle, the improved process according to the present invention consists in isolating the citric acid from the fermentation solution in the form of its alkali metal salts and in recovering the acid from such salts directly in one single operation. This new and improved process is based on the surprising fact that certain alkali metal salts of citric acid crystallize from a citric acid containing fermentation solution when neutralizing such a solution by the addition of alkaline alkali metal compounds in such a manner that the mono-, di-, or trialkali metal citrates are obtained.

It has been found to be an essential feature of this process that the fermentation solution be concentrated by evaporation in a vacuum to a concentration of at least 40%, calculated for free citric acid. That certain alkali metal salts of citric acid would crystallize in a good yield under such conditions is quite surprising because it is known that the alkali metal salts of citric acid crystallize rather difficultly even from their pure aqueous solutions. Furthermore, it was not to be expected that such difficultly crystallizable salts would be obtained from aqueous solutions containing impurities derived from the molasses used as starting material. It is well known that such impurities impede or even inhibit crystallization. It is, therefore, not surprising that not all the theoretically conceivable alkali metal salts of citric acid can be produced in crystalline form according to the present invention. For instance, of the potassium metal salts only the mono-potassium di-hydrogen citrate of the formula $$KH_2(C_6H_5O_7)$$

can be obtained in crystalline form. Of the sodium salts, however, all three possible salts can be recovered in the form of crystals.

Partial or complete neutralization of a citric acid fermentation solution by means of alkali metal hydroxides, bicarbonates, or carbonates can be effected before concentrating by evaporation the solution, or thereafter. Preferably, however, neutralization is carried out after concentration because the fermentation solution foams in a vacuum very considerably when partly or completely neutralized, i.e. the higher its pH-value is, the greater is its tendency to foam. In any case, it is advisable to add a small amount of defoaming agent to the solution.

After concentrating by evaporation and neutralizing the citric acid fermentation solution to a concentration of at least 40%, calculated for free citric acid, the alkali metal salts crystallize on standing or on slowly stirring the solution. Preferably seed crystals are added. Crystallization is ordinarily completed within 24 hours. Separation of the crystals from the mother liquor is effected by the usual methods, for instance, by centrifuging. On washing the crystals with a very small amount of water, there is obtained an almost white or slightly yellowish-brown crystalline precipitate depending upon the type of alkali metal citrate recovered. Said crystalline precipitate is directly worked up to citric acid as will be described hereinafter. The yield of alkali metal citrate, calculated for citric acid, as obtained by a single crystallization of the neutralized acid fermentation solution depends upon the final concentration which is attained on concentrating the solution. It was found, however, that the alkali metal citrate solution can be concentrated by evaporation only to a maximum content of 85% of citric acid when continuing the concentration to a still higher salt content, no crystalline precipitate is obtained from the resulting sirupy mass. The optimum concentrations for crystallization differ with respect to the various alkali metal citrates. They are about as follows:

Percent of citric acid
Mono-potassium di-hydrogen citrate_____ 58–65
Mono-sodium di-hydrogen citrate_____ 55–68
Di-sodium mono-hydrogen citrate_____ 52–62
Tri-sodium citrate_____ 65–85

In general, the citric acid fermentation solution is neutralized by the addition of the respective alkali metal hydroxide bicarbonate or carbonate in an amount sufficient to produce a salt of the composition of the desired crystals. Slight variations of the required neutralization value are of no significant importance. Their effect upon crystallization of the desired alkali metal citrate depends upon the kind of impurities present in the fermentation solution and can readily be determined by preliminary experiments. For instance, when recovering mono-potassium di-hydrogen citrate from a citric acid fermentation solution obtained by fermentation of molasses, care must be taken that the molasses contains considerable amounts of potassium ions so that the citric acid is present in the fermentation solution, at least partly, in the form the mono-potassium di-hydrogen citrate. The potassium ions initially present in the fermentation solution are preferably sufficient for neutralizing 8 to 14 moles of each 100 moles of the citric acid present in the fermentation solution.

The yield of citric acid on recovering it in the form of its alkali metal salts is between about 50% and about 80% depending upon the selected salt. Citric acid which remains in the mother liquor together with most of the impurities is recovered therefrom by precipitation in the form of a calcium salt. Preferably, the citric acid is not precipitated as tri-calcium citrate and also not as calcium mono-hydrogen citrate as it was known heretofore, but in the form of the mono-alkali metal calcium citrate. For this purpose, one mole of calcium ions per mole of citric acid present in the mother liquor is added thereto. When using a completely neutralized mother liquor, as obtained when recovering the tertiary alkali metal salts, a calcium chloride solution has proved to be especially suitable for the precipitation of said mono-alkali metal calcium citrate. When using partly neutralized mother liquors, as they are obtained on crystallizing the primary or secondary alkali metal citrates, precipitation is preferably effected by means of calcium carbonate and/or calcium hydroxide.

The precipitated mono-alkali metal calcium citrate is preferably precipitated while heating and is washed with hot water. It is more readily filterable than tri-calcium citrate and calcium mono-hydrogen citrate which have been previously precipitated as intermediate products.

The resulting mono-alkali metal calcium citrate is then reacted with 1 mole of sulfuric acid calculated for 1 mole of citrate. Thereby, a mono-alkali metal citrate solution and gypsum are obtained. While, when recovering citric acid by means of tri-calcium citrate, 1.5 moles of sulfuric acid are required for one mole of citric acid and, when recovering the citric acid in the form of calcium mono-hydrogen citrate, 1 mole of sulfuric acid is required for one mole of citric acid, only 0.5 mol to 0.2 mole of sulfuric acid are consumed per mole of citric acid, when proceeding according to the present invention, depending upon the yield of the alkali metal citrate. It is evident that not only considerable savings in chemicals are achieved when proceeding according to the present invention, but also that the amount of the waste product gypsum is considerably reduced. A further particular advantage of the process according to the present invention consists in the formation of readily filtrable gypsum crystals due to the presence of alkali metal ions. It has been found that gypsum, which is produced according to the present invention by reacting mono-alkali metal calcium citrate with sulfuric acid, filters about five to six times more rapidly and can also be more rapidly washed than gypsum as it is produced according to the heretofore known processes in the absence of alkali metal ions. At the same time, the amount of water which is required in order to completely wash the gypsum can be reduced by about 20% to about 25%.

The solution obtained after filtering off the gypsum contains in general only the mono-alkali metal di-hydrogen citrate. Said solution is further worked up either as such or, preferably, together with the alkali metal citrate crystals obtained as described hereinabove. If the initially obtained crystalline product obtained from the concentrated citric acid fermentation solution is also the mono-alkali metal di-hydrogen citrate, it is dissolved in the filtrate obtained on gypsum preparation and filtration. The resulting solution of mono-alkali metal di-hydrogen citrate is then further worked up to citric acid. Such further working up can be effected either by percolation through a number of columns containing cation exchange material in the hydrogen form. Said columns are arranged one after the other. Or citric acid is recovered from said solution by electrodialysis as described in Example 3. If di- or tri-alkali metal citrates have been obtained in crystalline form from the citric acid fermentation solution, simple ion exchange treatment for the production of the free acid will not be economical. In this case, recovery of citric acid by electrodialysis is the preferred procedure.

To set free citric acid by electrodialysis has the further advantage that this method permits recovery of the alkali metal compound used for neutralizing the citric acid fermentation solution. Thereby, a pure citric acid solution is obtained in continuous operation.

The various reactions which take place when operating according to the present invention are illustrated by the following reaction equations:

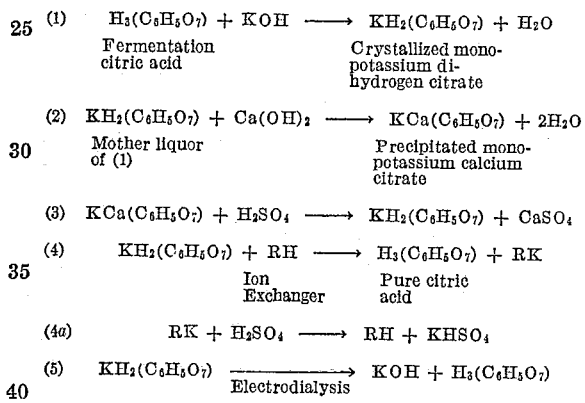

The following examples serve to illustrate the present invention without, however, limiting the same thereto.

*Example 1*

Three cu. m. of fermentation citric acid solution of a citric acid content of 20.8% which is partly neutralized to 8.4% equivalent percent by means of potassium ions, is mixed with a small amount of defoaming agent such as the product sold as "Silicone Bayer 66" by the firm Farbenfabriken Bayer Aktiengesellschaft, Leverkusen, Germany, and is concentrated in a vacuum of about 300 mm. Hg to a volume of one cu. m. 410 kg. of anhydrous potassium carbonate are gradually added to said concentrated fermentation citric acid solution. On addition of a small amount of mono-potassium citrate crystals serving as seed crystals and on allowing the seeded solution to stand for 20 hours, a comparatively solid crystalline sludge is obtained which is filled into a centrifuge and is centrifuged at 2800 revolutions per minute for 8 minutes. The centrifuged crystals are washed in the centrifuge with 100 l. of cold water. About 650 kg. of a crystalline sludge are obtained which contain 425 kg. of citric acid corresponding to about 67% of the amount of citric acid initially charged.

The resulting 340 l. of mother liquor and wash water are diluted to a volume of 600 l. and are heated to 95° C. A suspension of 60 kg. of calcium oxide in 500 l. of water is added thereto. The resulting precipitate is filtered by suction on a suction filter and is washed with 200 l. of water. The composition of the resulting white crystal powder is determnied analytically. It shows a molecular proportion of potassium:calcium:citric acid corresponding to 1.01:0.98:1.00. The total amount of mono-potassium calcium citrate contains 186 kg. of citric acid corresponding to a total yield of 98%.

The resulting mono-potassium calcium citrate is converted into a suspension by stirring with a dilute (about 4%) citric acid solution. Said solution is added in a thin stream to 125 kg. of 78% sulfuric acid. After stirring for 2 hours, the precipitated gypsum is filtered off and washed.

The crystalline mono-potassium di-hydrogen citrate obtained in the first crystallization step described hereinabove is then dissolved in the gypsum filtrate containing mono-potassium di-hydrogen citrate and the mixture is diluted with water to a concentration of about 45% calculated for citric acid. This solution is passed progressively through 5 cation exchange columns, each containing 300 l. of cation exchange material. The columns are washed with water. The citric acid solution discharged from the columns is almost colorless and has an ash content of 0.04%. It can directly be used for crystallization of a substantially pure citric acid.

The first two ion exchange columns are filled with a sulfonated carbon exchange material which has not only cation exchange properties but also acts as decolorizing agent. The following three cation exchange columns are filled with a strongly acid cation exchange resin of the type of a sulfonated polystyrene resin in the hydrogen form. The cation exchange material used in the ion exchange columns may, of course, be of different nature and origin. The following materials have proved to be highly effective:

A material of the sulfonated carbon type sold under the trademark "Dusarit S" by the firm Imacti, Netherlands.

*Example 2*

A fermentation citric acid solution to which a small amount of defoaming agent, for instance, a silicone defoaming agent is added, is concentrated by evaporation in a vacuum in a pilot plant apparatus to a citric acid concentration of about 76% of citric acid. The resulting warm solution is neutralized by means of a 6 N sodium hydroxide solution to a pH-value of 7.8 and is then cooled to 28° C. within about 4 hours by cooling with water while stirring. The resulting crystalline sludge is placed on a suction filter, the mother liquor is filtered off by suction, and the remaining crystalline sludge (trisodium citrate) is washed with a small amount of cold water.

Twice the amount of water is added to the mother liquor. Its citric acid content is determined analytically and the stoichiometrical amount of calcium chloride is added thereto to yield a molar ratio of 1:1 calculated for calcium chloride to citric acid. On heating to a temperature at 90° C. and on adjusting the pH-value to value of 8.0–8.2, a precipitate is obtained which, after filtering off by suction and washing, has a composition corresponding to a molar ratio of calcium to citric acid of 1.09:1.0. This precipitate consists of mono-sodium calcium citrate which is reacted with the stoichiometrical amount of sulfuric acid, calculated for its calcium content, as described in Example 1. The resulting mono-sodium di-hydrogen citrate solution is filtered to remove gypsum. It can be converted into substantially pure citric acid in the same manner as described for mono-potassium di-hydrogen citrate in Example 1.

*Example 3*

A fermentation citric acid solution as used in Example 2 is concentrated by evaporation in a vacuum until its citric acid content amounts to 56%. Sodium carbonate solution is carefully added thereto in an amount sufficient to produce di-sodium mono-hydrogen citrate. The resulting partly neutralized citric acid solution is then cooled, while stirring, to about 20° C. On adding a small amount of di-sodium mono-hydrogen citrate crystals for seeding, crystallization of said salt is initiated. The crystals are filtered off by suction and are washed with a small amount of cold water.

The mother liquor is diluted with twice its amount of water and its citric acid content is determined analytically. Calcium carbonate is then gradually added thereto in an amount corresponding to one mole of calcium for one mole of citric acid. Thereby the mono-sodium calcium citrate precipitates. It is worked up in the same manner as described in Example 1 for the mono-potassium calcium citrate and yields substantially pure citric acid. In place of calcium carbonate, calcium oxide and calcium chloride can also be added in an amount sufficient to precipitate, on cooling, sodium calcium citrate.

The crystallized di-sodium mono-hydrogen citrate obtained in the first step of the above mentioned reaction, is worked up to citric acid by electrodialysis. For this purpose the di-sodium mono-hydrogen citrate is dissolved in water to a concentration of 20% calculated for citric acid. This solution is introduced into the second chamber of an electrodialyltic cell consisting of all together four chambers. The chambers of the cell are formed by successive arrangement of:

A stainless steel cathode, a permselective cation exchange membrane, an anion exchange membrane, a cation exchange membrane, and a graphite anode. The first chamber of said cell (numbered from left to right), defined by the cathode and the first cation exchange membrane, is filled with about 2 N sodium hydroxide solution, the second chamber contains the above mentioned solution of di-sodium mono-hydrogen citrate. Through the third chamber flows a stream of pure citric acid solution and the last chamber, the anode compartment, contains about 1 N sulfuric acid. If a potential difference is applied to the electrodes of this cell the sodium ions of the di-sodium mono-hydrogen citrate migrate through the cation exchange membrane on the left side of the solution towards the cathode compartment to form there sodium hydroxide. At the same time citrate anions migrate in direction of the anode and pass the anion exchange membrane. The required hydrogen ions to form citric acid with the transferred citrate anion are supplied from the fourth compartment from which hydrogen ions migrate into the chamber of citric acid. On this way the concentration of pure free acid rises and may be drawn off as the product (see the appended diagrammatic illustration).

*Example 4*

The procedure is the same as described in Example 1, but the fermentation citric acid solution is concentrated by evaporation in a vacuum after neutralization with potassium carbonate. The partly neutralized citric acid solution has a greater tendency to foam on concentration than the non-neutralized solution. Therefore, concentration by evaporation must be effected quite carefully and slowly. Yield and purity of the resulting mono-potassium di-hydrogen citrate and citric acid are about the same as those achieved when proceeding according to Example 1.

Of course, many changes and variations in the reaction conditions, temperature, and duration, and in the method of working up and of purifying the various citrates and solutions and the like may be made by those skilled in the art in accordance with the principles set forth herein and in the claims annexed hereto.

Defoaming agents as they can be used when concentrating the fermentation citric acid solutions are, for instance, the defoaming agent sold under the trademark "Silicone Bayer 66" by the firm Farbenfabriken Bayer A.G., Leverkusen, Germany.

I claim:

1. In a process of recovering citric acid from strongly contaminated citric acid solutions obtained on fermentation of sugar-containing solutions by means of *Aspergillus niger*, the steps which comprise concentrating by evaporation in a vacuum the fermentation citric acid solution to a citric acid concentration between about 40% and about 85%, adding to the concentrated citric acid solution an alkali metal compound selected from the group consisting of an alkali metal hydroxide, an alkali metal carbonate, and an alkali metal bicarbonate in an amount sufficient to form the mono-alkali metal dihydrogen citrate, allowing the resulting citrate solution to stand until crystallization is completed, separating the precipitated crystalline mono-alkali metal di-hydrogen citrate from the mother liquor, washing said mono-alkali metal di-hydrogen citrate with water, combining the mother liquor and the wash water, adding to said combined mother liquor and wash water a calcium compound selected from the group consisting of calcium hydroxide, calcium carbonate, and calcium chloride, in an amount corresponding to one mole of calcium for one mole of calculated citric acid present in the mother liquor, filtering off the precipitated mono-alkali metal calcium citrate, suspending said mono-alkali metal calcium citrate in water, adding thereto the stoichiometric amount of sulfuric acid to react with and precipitate substantially all the calcium present in said mono-alkali metal calcium citrate, filtering off the precipitated gypsum, and converting the resulting mono-alkali metal di-hydrogen citrate into substantially pure citric acid by electrodialysis.

2. In a process of recovering alkali metal citrates from strongly contaminated citric acid solutions obtained on fermentation of sugar-containing solutions by means of *Aspergillus niger*, the steps which comprise concentrating by evaporation in a vacuum the fermentation citric acid solution to a citric acid concentration between about 40% and about 85%, adding to the concentrated citric acid solution an alkali metal compound selected from the group consisting of an alkali metal hydroxide, an alkali metal carbonate, and an alkali metal bicarbonate in an amount sufficient to form an alkali metal citrate, allowing the resulting citrate solution to stand until crystallization is completed, separating the precipitated crystalline alkali metal citrate from the mother liquor, washing said alkali metal citrate with water, combining the mother liquor and the wash water, adding to said combined mother liquor and wash water a calcium compound selected from the group consisting of calcium hydroxide, calcium carbonate, and calcium chloride in an amount corresponding to one mole of calcium for one mole of calculated citric acid present in the mother liquor, filtering off the precipitated mono-alkali metal calcium citrate, suspending said mono-alkali metal calcium citrate in water, adding thereto the stoichiometric amount of sulfuric acid to react with and precipitate substantially all the calcium present in said mono-alkali metal calcium citrate, and filtering off the precipitated gypsum from the resulting solution of the alkali metal citrate.

3. In a process of recovering mono-alkali metal citrates from strongly contaminated citric acid solutions obtained on fermentation of sugar-containing solutions by means of *Aspergillus niger*, the steps which comprise adding to such a citric acid solution an alkali metal compound selected from the group consisting of an alkali metal hydroxide, an alkali metal carbonate, and an alkali metal bicarbonate in an amount sufficient to form the mono-alkali metal di-hydrogen citrate, concentrating by evaporation in a vacuum the partly neutralized citric acid solution to a citric acid concentration between about 40% and about 85%, allowing the resulting citrate solution to stand until crystallization is completed, separating the precipitated crystalline alkali metal citrate from the mother liquor, washing said alkali metal citrate with water, combining the mother liquor and the wash water, adding to said combined mother liquor and wash water a calcium compound selected from the group consisting of calcium hydroxide, calcium carbonate, and calcium chloride, in an amount corresponding to one mole of calcium for one mole of calculated citric acid present in the mother liquor, filtering off the precipitated monoalkali metal calcium citrate, suspending said mono-alkali metal calcium citrate in water, adding thereto the stoichiometric amount of sulfuric acid to react with and precipitate substantially all the calcium present in said monoalkali metal calcium citrate, and filtering off the precipitated gypsum from the resulting solution of the alkali metal citrate.

4. In a process of recovering citric acid from strongly contaminated citric acid solutions obtained on fermentation of sugar-containing solutions by means of *Aspergillus niger*, the steps which comprise concentrating by evaporation in a vacuum the fermentation citric acid solution to a citric acid concentration between about 40% and about 85%, adding to the concentrated citric acid solution sodium hydroxide in an amount sufficient to convert said acid into the tri-sodium citrate, allowing the resulting citrate solution to stand until crystallization is completed, separating the precipitated crystalline tri-sodium citrate from the mother liquor, washing said citrate with water, heating the combined mother liquor and wash water to about 95° C., adding thereto calcium chloride in an amount sufficient to precipitate mono-sodium calcium citrate, filtering off said mono-sodium calcium citrate, suspending said citrate in water, adding thereto the stoichiometric amount of sulfuric acid to react with and precipitate substantially all the calcium present in said mono-sodium calcium citrate, filtering off the precipitated gypsum, combining the filtrate containing mono-sodium di-hydrogen citrate with the washed tri-sodium citrate obtained by neutralizing the concentrated ferementation citric acid solution, and converting the citrates into substantially pure citric acid by electrodialysis.

5. In a process of recovering citric acid from strongly contaminated citric acid solutions obtained on fermentation of sugar-containing solutions by means of *Aspergillus niger*, the steps which comprise concentrating by evaporation in a vacuum the fermentation citric acid solution to a citiric acid concentration between about 40% and about 85%, adding to the concentrated citric acid solution sodium hydroxide in an amount sufficient to convert said acid into the di-sodium mono-hydrogen citrate, allowing the resulting citrate solution to stand until crystallization is completed, separating the precipitated crystalline di-sodium mono-hydrogen citrate from the mother liquor, washing said citrate with water, heating the combined mother liquor and wash water to about 95° C., adding thereto calcium oxide and calcium chloride in an amount sufficient to precipitate, on cooling, mono-sodium calcium citrate, filtering off said mono-sodium calcium citrate, suspending said citrate in water, adding thereto the stoichiometric amount of sulfuric acid to react with and precipitate substantially all the calcium present in said mono-sodium calcium citrate, filtering off the precipitated gypsum, combining the filtrate containing mono-sodium di-hydrogen citrate with the washed di-sodium monohydrogen citrate obtained by neutralizing the concentrated fermentation citric acid solution, and converting the citrates into substantially pure citric acid by electrodialysis.

6. The process according to claim 1 wherein conversion of the alkali metal citrate into pure citric acid by electrodialysis is effected by passing the alkali metal citrate solution through the second chamber of a four-compartment electrodialysis cell, said cell being formed by successive arrangement of a stainless steel cathode, a permselective cation exchange membrane, an anion exchange membrane, a cation exchange membrane, and a graphite anode, the cathode compartment of said cell being filled with a 2 N alkali metal hydroxide solution, the neighboring second chamber containing said citrate solution, the next following chamber being supplied with a solution of pure citric acid, the anode compartment being filled with N sulfuric acid, and a direct current being passed through said cell, said current causing the alkali metal ions of said citrate solution to pass through the first mentioned cation exchange membrane and to form alkali metal hydroxide at the cathode, and the citrate anions to pass through said anion exchange membrane and to increase the concentration of the citric acid in its compartment, and withdrawing the citric acid from the citric acid chamber.

References Cited in the file of this patent

UNITED STATES PATENTS

| | | |
|---|---|---|
| 2,159,155 | Holton | May 23, 1939 |
| 2,193,904 | Holton | Mar. 19, 1940 |
| 2,848,403 | Rosenberg | Aug. 19, 1958 |
| 2,860,095 | Katz et al. | Nov. 11, 1958 |

OTHER REFERENCES

Royals: "Advanced Organic Chemistry" (1954), page 722.

Nachod et al.: "Ion Exchange Technology" (1956), pages 138–141.